US010726708B2

(12) United States Patent
Pace

(10) Patent No.: US 10,726,708 B2
(45) Date of Patent: Jul. 28, 2020

(54) AUTOMATIC GUNSHOT DETECTION AND SUPPRESSION RESPONSE SYSTEM

(71) Applicant: THE UNITED STATES OF AMERICA, AS REPRESENTED BY THE SECRETARY OF THE NAVY, Arlington, VA (US)

(72) Inventor: Phillip E. Pace, San Juan Bautista, CA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/421,951

(22) Filed: May 24, 2019

(65) Prior Publication Data

US 2019/0371160 A1    Dec. 5, 2019

Related U.S. Application Data

(60) Provisional application No. 62/678,888, filed on May 31, 2018.

(51) Int. Cl.
| | | |
|---|---|---|
| *G08B 21/00* | (2006.01) | |
| *G08B 25/10* | (2006.01) | |
| *G08B 13/16* | (2006.01) | |
| *G08B 13/196* | (2006.01) | |
| *G06K 9/00* | (2006.01) | |

(52) U.S. Cl.
CPC ......... *G08B 25/10* (2013.01); *G08B 13/1672* (2013.01); *G08B 13/19608* (2013.01); *G08B 13/19645* (2013.01); *G06K 9/00771* (2013.01)

(58) Field of Classification Search
CPC .................................................... G08B 25/10
USPC ......... 340/540, 541, 521, 635–638; 367/128, 367/906
See application file for complete search history.

(56) References Cited

U.S. PATENT DOCUMENTS

| | | | |
|---|---|---|---|
| 6,269,726 B1 | 8/2001 | McNulty, Sr. | |
| 7,203,132 B2* | 4/2007 | Berger | G01S 5/20 367/129 |
| 7,411,865 B2* | 8/2008 | Calhoun | G01S 7/003 367/124 |
| 7,688,679 B2* | 3/2010 | Baxter | G01S 5/22 367/128 |
| 8,467,548 B2 | 6/2013 | Karunasiri et al. | |
| 9,286,790 B2 | 3/2016 | Lyman et al. | |
| 9,336,670 B2 | 5/2016 | Jones, Jr. et al. | |
| 9,417,762 B2* | 8/2016 | Frost | G06F 3/011 |

(Continued)

OTHER PUBLICATIONS

The Guardian Indoor Active Shooter Detection System. pp. 1-2. [online] [retrieved on May 28, 2019]. Retrieved from the Internet: <URL: https://www.isceast.com/__novadocuments/515551?v=636737597956670000>.

(Continued)

*Primary Examiner* — Tai T Nguyen
(74) *Attorney, Agent, or Firm* — Naval Postgraduate School; Lisa A. Norris

(57) ABSTRACT

The invention automatically detects a gunshot at a plurality of detection and response nodes distributed in an area, determines the location of the active shooter, and deploys a suppression response to the location of the active shooter from each of the plurality of detection and response nodes to prevent the active shooter from firing further gunshots.

13 Claims, 5 Drawing Sheets

(56) References Cited

U.S. PATENT DOCUMENTS

| | | | |
|---|---|---|---|
| 9,741,223 B2* | 8/2017 | Dodson | G08B 25/006 |
| 9,830,932 B1 | 11/2017 | Gunderson et al. | |
| 9,843,858 B1 | 12/2017 | Karunasiri et al. | |
| 10,168,125 B2* | 1/2019 | Crowe | F41H 9/00 |
| 2010/0264217 A1* | 10/2010 | Kumhyr | G08B 15/02 |
| | | | 235/400 |
| 2014/0334058 A1 | 11/2014 | Galvan et al. | |
| 2016/0232774 A1 | 8/2016 | Noland et al. | |

OTHER PUBLICATIONS

Active Shooter Response for First Responders. pp. 1-4. [online] [retrieved on May 28, 2019]. Retrieved from the Internet: <URL: http://partners.decisionbriefs.com/battelle/files/post_attachment/489.pdf>.

* cited by examiner

AUTOMATIC GUNSHOT DETECTION AND SUPPRESSION RESPONSE SYSTEM

CROSS-REFERENCE TO RELATED APPLICATIONS

This application claims the benefit of U.S. Provisional Application No. 62/678,888, filed May 31, 2018, which is hereby incorporated in its entirety by reference.

BACKGROUND OF THE INVENTION

1. Field of the Invention

The present invention relates generally to a system and method for automatically detecting a gunshot fired by an active shooter and initiating a response to suppress the active shooter.

2. Description of the Related Art

Today's schools and other public forums are an open area for active shooters—individuals utilizing loaded firearms to harm others. Preventative measures, such as mental health screening and gun control have provided some limited deterrence, but do not address the danger once an active shooter is in place and discharging a firearm. Active shooter incidents are unpredictable, progress quickly, and typically do not last for a long period of time. Often the incidents are over before law enforcement arrives. As firearms can be discharged quickly, a large amount of harm can occur during a short period of time. Thus, the faster an active shooter can be stopped, potentially, the less harm can occur.

SUMMARY OF THE INVENTION

Embodiments in accordance with the invention, automatically detect a gunshot sound at a plurality of detection and response nodes distributed in an area, determine the location of the source of the gunshot sound, i.e., the location of an active shooter, aim response mechanisms, such as a Tasers, at the location, and deploy a suppression response, such as active Taser elements, from each of the nodes to the location to stop the active shooter from further shooting.

In accordance with one embodiment, a system for automatic gunshot detection and suppression response includes: a computer system including a method for automatic gunshot detection and suppression response; a plurality of detection and response nodes; and a network communicatively connecting each of the plurality of detection and response nodes with the computer system including the method for automatic gunshot detection and suppression response, wherein the system automatically detects a gunshot fired from a gun by an active shooter, determines the location of the active shooter, and deploys a suppression response from each of the plurality of detection and response nodes to the location of the active shooter to stop the active shooter from firing the gun.

In accordance with another embodiment, a method for automatic gunshot detection and suppression response includes: detecting a gunshot sound impulse at one or more detection and response nodes located in an area, the gunshot sound impulse originating from a gun fired by an active shooter in the area, each of the one or more detection and response nodes located in the area at respective locations; automatically generating a timestamp indicating a time of arrival (TOA) of the gunshot sound impulse detection at each of the one or more detection and response nodes; automatically determining the location of the active shooter based on the TOA associated with each of the one or more detection and response nodes; automatically generating targeting information for each of the one or more detection and response nodes based on the location of the active shooter; automatically positioning an associated response mechanism of each of the one or more detection and response nodes to target the location of the active shooter based on the targeting information; and automatically deploying a suppression response from each associated response mechanism to the targeted location of the active shooter, wherein the suppression response stops the active shooter from firing the gun.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Figure 1:
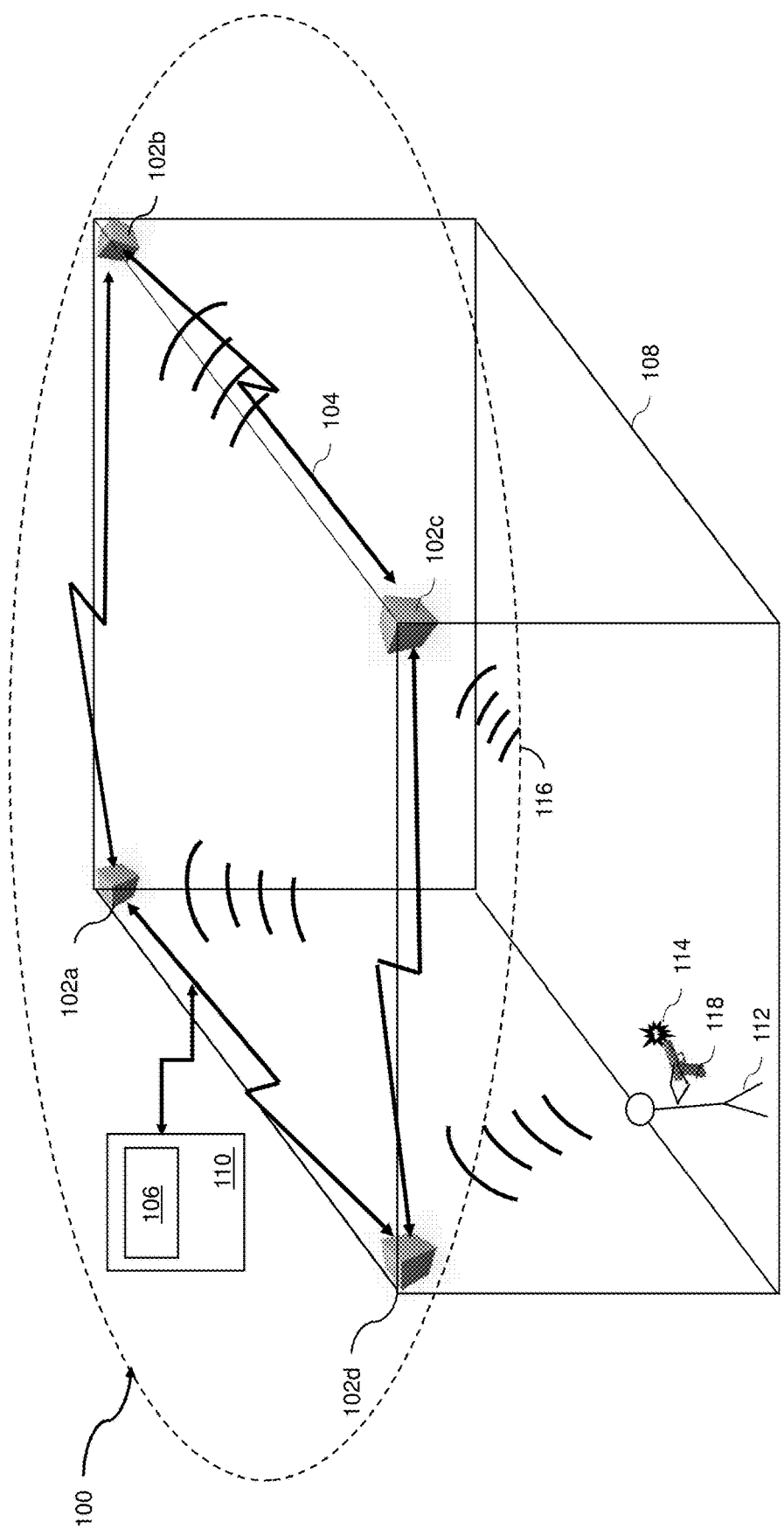
FIG. 1 is a schematic illustration of an automatic gunshot detection and suppression response system in accordance with one embodiment of the invention.

FIG. 1 is a schematic illustration of an automatic gunshot detection and suppression response system 100 in accordance with one embodiment of the invention. In one embodiment, system 100 includes one or more detection and response nodes 102, herein also referred to as nodes 102, communicatively coupled by a network 104 to a method 106 for automatic gunshot detection and suppression response executing on a computer system 110. Network 104 can be any of various network types, for example, a wired network, a fiber optic network, a wireless network, or a combination. In the example shown in FIG. 1, network 104 is a wireless network. When a gunshot 114 is fired by an active shooter 112, system 100 detects gunshot 114, determines the location of active shooter 112, and fires a suppression response from each of nodes 102 to the location of active shooter 112 to stop active shooter 112 from further firing.

In the example embodiment illustrated in FIG. 1, four nodes 102, shown as nodes 102a, 102b, 102c, and 102d, are installed in different ceiling corners of a room 108. As further described herein, each of nodes 102a-102d and method 106 executing on computer system 110 are communicatively networked together via network 104 to permit the communication of signals and data between all nodes 102a-102d and method 106. An example of computer system 110 is further described later herein with reference to FIG. 5.

Although the embodiment of system 100 shown in FIG. 1 illustrates four nodes 102, fewer or more nodes 102 can be used.

In one embodiment, when gunshot 114 is fired from a gun 118 by active shooter 112 at a location in room 108, gunshot 114 effects one or more gunshot sound impulses 116 that are detected by nodes 102a-102d. When nodes 102a-102d detect a gunshot sound impulse 116, each node 102a-102d generates a timestamp indicating the time of arrival (TOA) of the gunshot sound impulse detection and communicates the TOA to method 106 via network 104. Method 106 determines the location of active shooter 112 based on the TOAs from nodes 102a-102d. Method 106 generates targeting information based on the location for each of nodes 102a-102d and communicates the targeting information back to nodes 102a-102d via network 104. Each of nodes 102a-102d aims an associated response mechanism, such as a Taser (available for example from Axon, Scottsdale, Ariz.), at the location of active shooter 112 in accordance with the targeting information, and communicates a targeting confirmation to method 106 via network 104. On receipt of the targeting confirmations from nodes 102a-102d, method 106 issues a fire command to nodes 102a-102d. On receipt of the fire command, nodes 102a-102d each deploy a suppression response, such as active Taser elements, to the targeted location in order to stop active shooter 112 from further firing gunshots. System 100 and method 106 are further described herein with reference to FIGS. 2, 3, 4, and 5.

Figure 2:
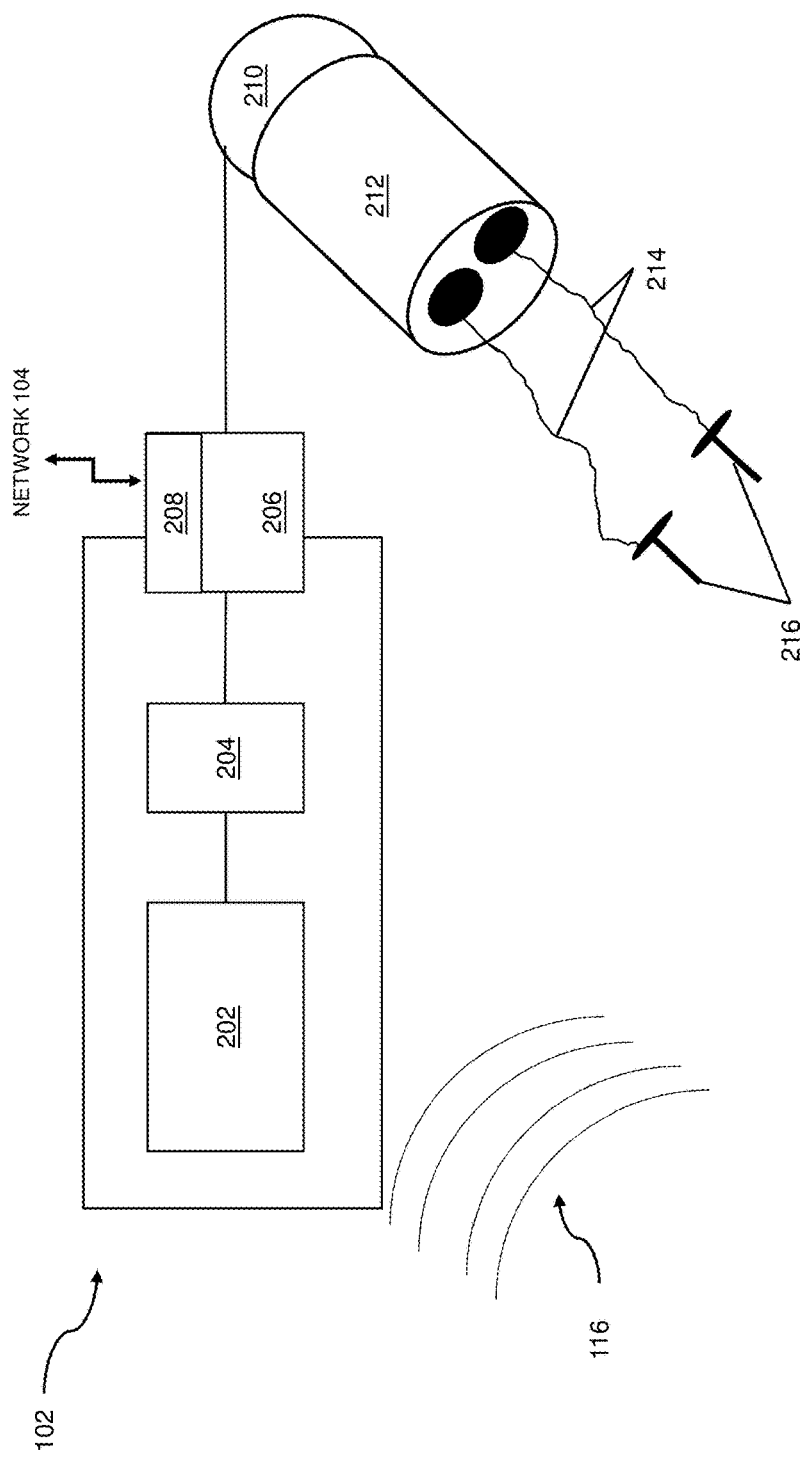
FIG. 2 is a schematic illustration of a detection and response node in accordance with one embodiment of the invention.

FIG. 2 is a schematic illustration of a detection and response node 102, such as nodes 102a-102d of FIG. 1, in accordance with one embodiment of the invention. Referring now to FIGS. 1 and 2 together, in one embodiment, node 102 includes: an acoustic sensor 202; an analog-to-digital converter (ADC) 204; a network-enabled signal processor 206; a positioning module 210; and a response mechanism 212.

In one embodiment, acoustic sensor 202 is configured to detect acoustic gunshot sound impulses 116, and to communicate the detection to ADC 204 with no false alarms. In one embodiment, acoustic sensor 202 is programmed to detect acoustic gunshot sound impulses having one or more specified frequency pattern(s) consistent with a gunshot frequency pattern, with no false alarms. In some embodiments, acoustic sensor 202 can detect the direction of arrival of a gunshot sound impulse. See, for example, U.S. Pat. No. 9,843,858 to Karunasiri et al. and U.S. Pat. No. 8,467,548 to Karunasiri et al.

Acoustic sensor 202 communicates the gunshot detection to ADC 204. In one embodiment, ADC 204 has a specified sampling speed and converts analog signals received from acoustic sensor 202 to digital signals. ADC 204 communicates the digital signals to signal processor 206. In various embodiments, ADC 204 may be incorporated into acoustic sensor 202 or signal processor 206.

Signal processor 206 is configured to receive the detection signals from ADC 204, and to generate a timestamp indicating a TOA of the detection signal. In one embodiment, the TOA is determined by signal processor 206 using the sampling speed of ADC 204. For example, for a sampling speed of 1 GS/s, the TOA resolution is 1 ns. Currently, in one embodiment, this TOA resolution is viewed as adequate for geolocating a gunshot sound source, i.e., the location of active shooter 112. Calculation of a TOA is well known to those of skill in the art and not further detailed herein. Signal processor 206 is further configured to communicate the TOA to method 106 via network 104, for example, via a network interface 208.

Signal processor 206 is also further configured to receive targeting information generated by method 106 via network 104 and to communicate the targeting information to positioning module 210. Signal processor 206 is also configured to receive firing signals, such as fire commands, generated by method 106 via network 104 and to communicate the firing signals to response mechanism 212 and then communicate back to method 106 via network 104 a targeting confirmation when positioning module 210 is targeted in accordance with the targeting information.

Positioning module 210 is configured to receive targeting information generated by method 106 and communicated via signal processor 206 and to automatically aim response mechanism 212 to target the location of active shooter 112 in accordance with the targeting information. Positioning module 210 is further configured to generate and communicate a targeting confirmation back to method 106 via signal processor 206 when targeting is completed.

Response mechanism 212 is configured to receive firing signals generated by method 106 communicated via signal processor 206 and to automatically deploy, i.e., fire, a suppression response to the targeted location of active shooter 112. In one embodiment, response mechanism 212 is a Taser gun, and on receipt of a firing signal, response mechanism 212 automatically deploys active Taser elements 216, having powered conductive leads 214, to the targeted location of active shooter 112. In this way, active shooter 112 is impacted with active elements 216 and stopped from further firing gun 118. In one embodiment, response mechanism 212 is a device that meets industry standards as a non-lethal device.

Figure 3:
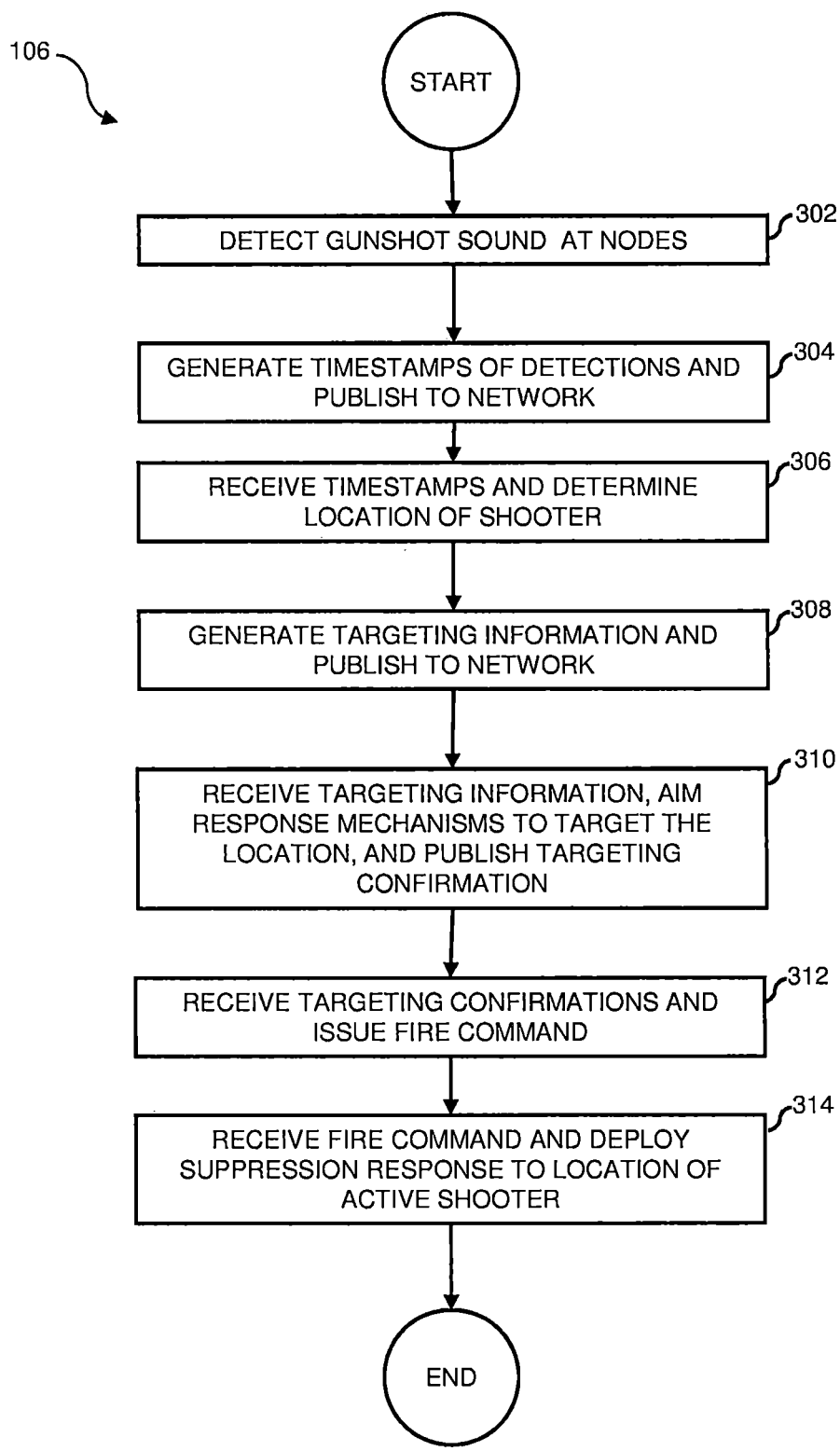
FIG. 3 illustrates a process flow diagram of a method for automatic gunshot detection and suppression response in accordance with one embodiment of the invention.

FIG. 3 illustrates a process flow diagram of method 106 for automatic gunshot detection and suppression response in accordance with one embodiment of the invention. At startup of system 100, in one embodiment, method 106 initiates system checks to ensure nodes 102a-102d are active and ready, that the location of each of nodes 102a-102d is loaded, and that computer 110 and nodes 102a-102d are synchronized on network 104. Referring now to FIGS. 1, 2 and 3, together, in operation 302, gunshot sound impulses 116 are detected by acoustic sensor 202 of each associated nodes 102a-102d. In operation 304, each acoustic sensor 202 communicates the detection to an associated ADC 204 which converts the analog signal to a digital signal and communicates the detection to an associated signal processor 206. Each signal processor 206 generates a timestamp indicating a TOA for the detection. Each signal processor 206 then communicates the generated TOA to method 106 via network 104.

In operation 306, method 106 receives the TOAs generated by each of nodes 102a-102d and determines the location of active shooter 112. In one embodiment, the respective TOAs generated by each of nodes 102a-102d are used to calculate a time difference of arrival (TDOA). The TDOA is then used to determine the location of active shooter 112. For example, the well-known methods of trilateration and triangulation can be used to determine the geodetic coordinates of the location of active shooter 112 based on the TDOAs and the known locations of each of nodes 102a-102d. It can be appreciated by those of skill in the art, that in various other embodiments, other methods of determining the location of active shooter 112 using the received TOAs and other information can also be used. For example, where the acoustic sensor technology utilized in acoustic sensors 202 provide directional information, the directional information can also be communicated to method 106 and utilized in determining the location of active shooter 112.

In operation 308, method 106 generates targeting information for each of nodes 102a-102d based on the determined location of active shooter 112 and communicates the targeting information to each of nodes 102a-102d via network 104. In one embodiment, each targeting information includes the geodetic coordinates of the location of active shooter 112. In another embodiment, each targeting information is a set of axis rotation commands that allow each positioning module 210 of an associated node 102a-102d to aim at the location of active shooter 112.

In operation 310, each signal processor 206 receives their individual targeting information and communicates the targeting information to the associated positioning module 210 of a node 102a-102d. Each positioning module 210 then aims the associated response mechanism 212 to target the location of active shooter 112 as indicated by the targeting information. Each associated positioning module 210 of nodes 102a-102d communicates a confirmation of targeting completion to signal processor 206 which communicates the targeting confirmation via network 104 to method 106.

In operation 312, on receipt of the targeting confirmations from nodes 102a-102d, method 106 generates and sends a fire command via network 104 to each of nodes 102a-10d via network 104. In operation 314, each response mechanism 212 of nodes 102a-102d receives the fire command and automatically deploys a suppression response, such as the firing of associated Taser active elements 216 to the location of active shooter 112. In this way, upon impact by active elements 216, active shooter 112 is immobilized by the electrical charge delivered by active elements 216 and stopped from further shooting.

Figure 4:
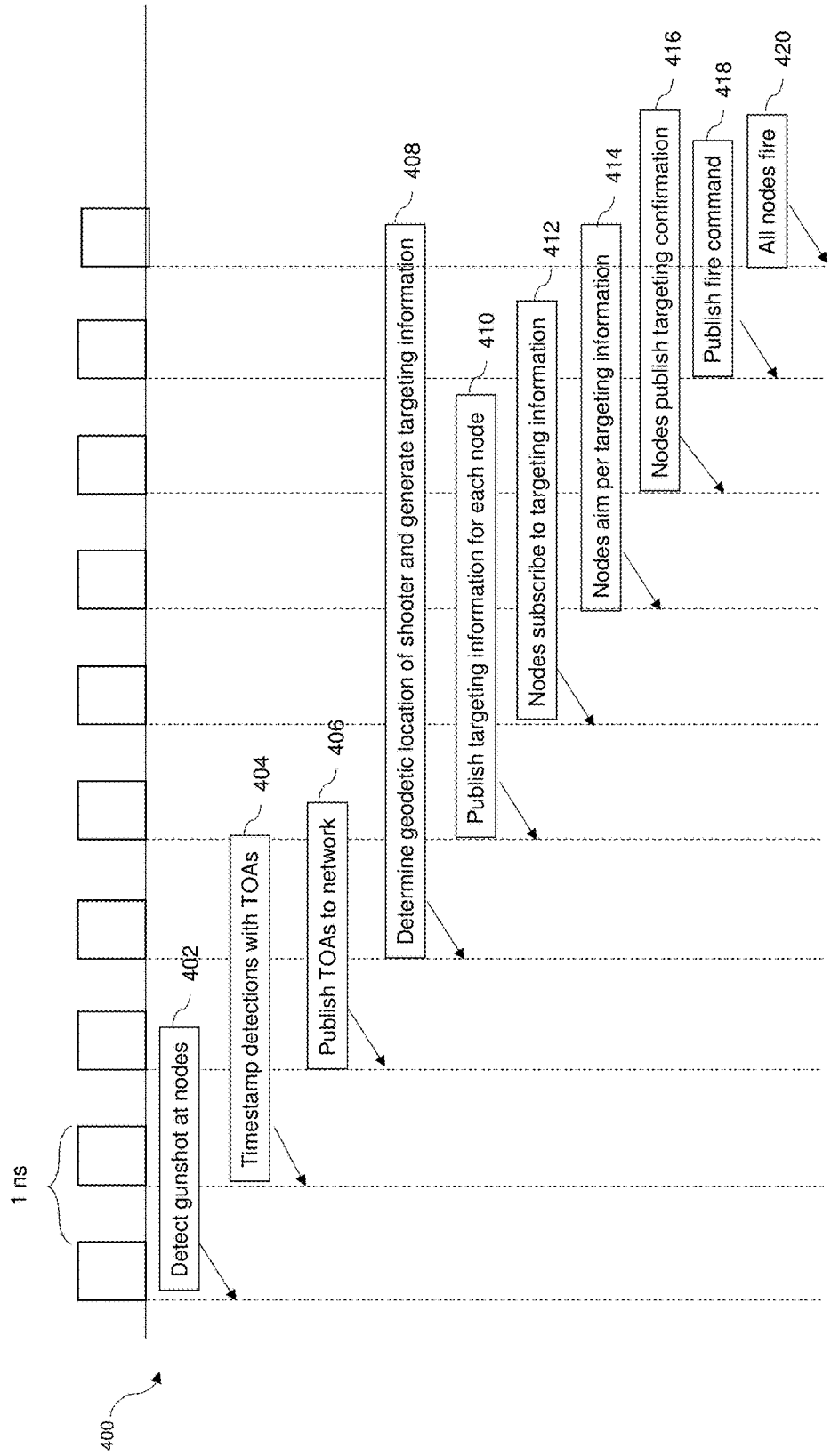
FIG. 4 illustrates a timing diagram in accordance with one embodiment of the invention.

FIG. 4 illustrates a timing diagram 400 showing an approximated number of clock cycles system 100 takes from gunshot sound impulse detection to a suppression response in accordance with one embodiment of the invention. As shown in FIG. 4, using a 1 GS/s sampling rate for ADC 204, and 1 clock cycle per computation, it will take approximately 9 ns, or less than a second (not including latency due to the network), from gunshot sound impulse detection to a suppression response, e.g., a Taser firing. Referring now to FIGS. 1 through 4 together, at timing marker 402, a gunshot sound impulse is detected by associated acoustic sensors 202 of nodes 102a-102d. Each acoustic sensor 202 communicates the detection to an ADC 204 which converts analog signals to digital signals. Each ADC 204 then communicates the digitized detection signal to an associated signal processor 206. At timing marker 404, each signal processor 206 receives the digital detection signal and timestamps the detection signal indicating the TOA of the detection. At timing marker 406, each of nodes 102a-102d publish their TOAs to network 104 for receipt by method 106.

At timing marker 408, method 106 utilizes the TOAs published by each of nodes 102a-102d to determine the geodetic coordinates of the location of active shooter 112. Based on the geodetic coordinates of the location of active shooter 112, method 106 generates targeting information for each of nodes 102a-102d. As earlier described, in one embodiment, each targeting information includes the geodetic coordinates of the location of active shooter 112. In another embodiment, each targeting information includes one or more sets of sets of axis rotation commands for each of nodes 102a-102d. At timing marker 410, the targeting information for each of nodes 102a-102d generated by method 106 are published to network 104. At timing marker 412, each of nodes 102a-102d receive their associated targeting information published to network 104. At timing marker 414, positioning modules 210 of associated nodes 102a-102d receive the targeting information and aim the associated response mechanism 212, i.e., a Taser, to the location of the active shooter 112 in accordance with the targeting information. At timing marker 416, after each response mechanism 212 is targeted, each of nodes 102a-102d publish a targeting confirmation to network 104. At timing marker 418, method 106 receives the targeting confirmations for nodes 102a-102d and publishes a fire command to network 104. At timing marker 420, nodes 102a-102d receive the fire command, and each associated response mechanism 212 fires a suppression response to the targeted location of active shooter 112. For example, in the present example, active Taser elements 216 are deployed to the location of active shooter 112 to immobilize active shooter 112 and prevent further shooting.

Figure 5:
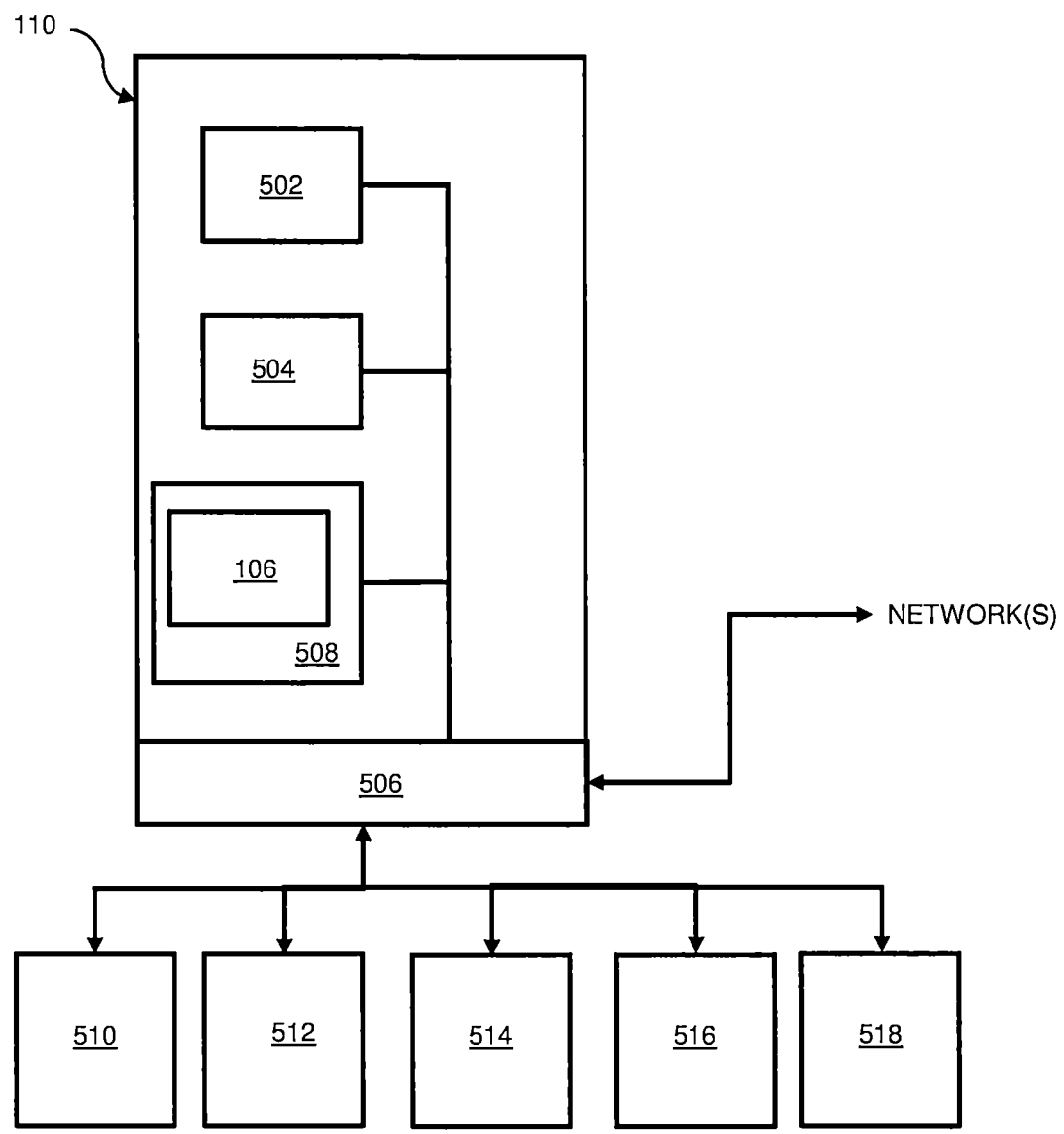
FIG. 5 is a schematic illustration of the computer system of FIG. 1 in accordance with one embodiment of the invention.

FIG. 5 is a schematic illustration of computer system 110 in accordance with one embodiment of the invention. Referring now to FIGS. 1 and 5 together, in one embodiment, computer system 110 includes: a central processing unit (CPU) 502, hereinafter processor 502; an operating system 504; one or more input/output (I/O) interface(s) 506; and a memory 508, including method 106, in one embodiment. In some embodiments, memory 508 may further include data on the locations of nodes 102 used in system 100, or may include a functionality that determines the locations of nodes 102. Memory 508 may also further include user programmable data for use by elements of system 100, such as acoustic threshold, acoustic patterns, and suppression mechanism settings. In various embodiments, I/O interfaces (s) 506 may include device interfaces as well as network interfaces that allow computer system 110 to communicate with different networks used in support of automatic gunshot detection and suppression response system 100.

Computer system 110 may further include standard devices such as a keyboard 510, a mouse 512, a printer 514, and a display device 516, as well as one or more standard input-output (I/O) devices 518, such as a compact disk (CD) or DVD drive, or other porting device for inputting data to and outputting data from computer system 110. In one embodiment, method 106 is loaded into computer system 110 as executable code via I/O device 518, such as from a CD, DVD, or other digital communicable form containing method 106, or via a network download. In the present embodiment, method 106 is stored in memory 508 and executed on computer system 110. In some embodiments, computer system 110 may be further coupled to a larger network (not shown), such as a larger security monitoring network. In some embodiment, method 106 can be fully or partially implemented on an external network. In one embodiment, method 106 can be embodied as a computer program product in a medium configured to store or transport computer readable code. Some examples of computer program products are CD-ROM discs, DVDs, ROM cards, and computer hard drives.

As described herein, embodiments in accordance with the invention automatically detect a gunshot sound impulse, determine the location of the source of the gunshot, and deploy a suppression response to the location to subdue the active shooter. This disclosure provides exemplary embodiments of the present invention. The scope of the present invention is not limited by these exemplary embodiments. It can be understood by one of skill in the art that system 100 and its components are connected to one or more power sources to enable the functionalities of system 100 to be implemented. In some embodiments, rather than utilizing a stand-alone computer 110, one or all of nodes 102a-102d may include microprocessor that executes method 106 and performs all or a portion of the functions of computer 110. In these embodiments, one node 102 may be designated the primary node and implements method 106. Numerous variations, whether explicitly provided for by the specification or implied by the specification or not, may be implemented by one of skill in the art in view of this disclosure.

What is claimed is:

1. A system for automatic gunshot detection and suppression response comprising:
    a computer system including a method for automatic gunshot detection and suppression response;
    a plurality of detection and response nodes, wherein each of the plurality of detection and response nodes further comprises:
        an acoustic sensor for detecting a gunshot sound impulse generated by a gunshot from an active shooter;
        an analog to digital converter (ADC) coupled to the acoustic sensor;
        a signal processor coupled to the ADC;
        a positioning module coupled to the signal processor, the positioning module configured to receive targeting information communicated from the signal processor and to automatically aim an associated response mechanism to target the location of the active shooter in accordance with the targeting information; and
        a response mechanism coupled to and positionable by the positioning module, the response mechanism for deploying a suppression response to the location of the active shooter; and
    a network communicatively connecting each of the plurality of detection and response nodes with the computer system including the method for automatic gunshot detection and suppression response,
    wherein the system automatically detects the gunshot fired from the gun by the active shooter, determines the location of the active shooter, and deploys a suppression response from each of the plurality of detection and response nodes to the location of the active shooter to stop the active shooter from firing the gun.

2. The system of claim 1, wherein the ADC has a sampling speed.

3. The system of claim 1, wherein the signal processor is a network enabled signal processor for sending and receiving signals on the network.

4. The system of claim 1, wherein each of the plurality of detection and response nodes are separately positioned in corners of a room near a ceiling.

5. The system of claim 1, wherein the response mechanism is a Taser, and the suppression response includes active elements deployed from the Taser.

6. The system of claim 1, wherein the location of the active shooter is determined as geodetic coordinates.

7. A detection and response apparatus comprising:
    an acoustic sensor for detecting a gunshot sound impulse;
    an analog to digital converter (ADC) coupled to the acoustic sensor;
    a network-enabled signal processor coupled to the ADC;
    a positioning module coupled to the network-enabled signal processor, the positioning module configured to receive targeting information communicated from the signal processor and to automatically aim an associated response mechanism to target the location of active shooter in accordance with the targeting information; and
    a response mechanism connected to and positionable by the positioning module, the response mechanism for automatically deploying a suppression response to a location.

8. The detection and response apparatus of claim 7 wherein the ADC has a sampling speed.

9. The detection and response apparatus of claim 8, wherein the network-enabled signal processor is configured to generate a timestamp indicating a time of arrival (TOA) of a detection of a gunshot sound impulse by the acoustic sensor.

10. A method for automatic gunshot detection and suppression response comprising:
    activating a plurality of detection and response nodes located in an area, wherein each of the plurality of detection and response nodes further comprises:
        an acoustic sensor for detecting a gunshot sound impulse generated by a gunshot from an active shooter;
        an analog to digital converter (ADC) coupled to the acoustic sensor;
        a signal processor coupled to the ADC;
        a positioning module coupled to the signal processor, the positioning module configured to receive targeting information communicated from the signal processor and to automatically aim an associated response mechanism to target the location of active shooter in accordance with the targeting information; and
        a response mechanism coupled to and positionable by the positioning module, the response mechanism for automatically deploying a suppression response to the location of the active shooter;
    detecting the gunshot sound impulse at the one or more detection and response nodes located in the area, the gunshot sound impulse originating from the gun fired by the active shooter in the area, each of the one or more detection and response nodes located in the area at respective locations;
    automatically generating a timestamp indicating a time of arrival (TOA) of the gunshot sound impulse detection at each of the one or more detection and response nodes;
    automatically determining the location of the active shooter based on the TOA associated with each of the one or more detection and response nodes;
    automatically generating targeting information for each of the one or more detection and response nodes based on the location of the active shooter;
    automatically positioning an associated response mechanism of each of the one or more detection and response nodes to target the location of the active shooter based on the targeting information; and
    automatically deploying a suppression response from each associated response mechanism to the targeted location of the active shooter,
    wherein the suppression response stops the active shooter from firing the gun.

11. The method of claim 10, wherein the location of the active shooter is determined as geodetic coordinates.

12. The method of claim 10, wherein the targeting information includes geodetic coordinates of the location of the active shooter for positioning an associated response mechanism of an associated detection and response node to target the location of the active shooter.

13. The method of claim 10, wherein the targeting information includes a set of axis rotation commands for positioning an associated response mechanism of an associated detection and response node to target the location of the active shooter.

* * * * *